US008797491B2

(12) United States Patent
Kim et al.

(10) Patent No.: US 8,797,491 B2
(45) Date of Patent: Aug. 5, 2014

(54) DISPLAY DEVICE HAVING FANOUT WIRING

(75) Inventors: Jeong-Il Kim, Asan-si (KR); Yun-Hee Kwak, Seoul (KR); Sang-Jin Jeon, Suwon-si (KR)

(73) Assignee: Samsung Display Co., Ltd., Yongin (KR)

( * ) Notice: Subject to any disclaimer, the term of this patent is extended or adjusted under 35 U.S.C. 154(b) by 329 days.

(21) Appl. No.: 12/698,404

(22) Filed: Feb. 2, 2010

(65) Prior Publication Data

US 2010/0283955 A1 Nov. 11, 2010

(30) Foreign Application Priority Data

May 11, 2009 (KR) ........................ 10-2009-0040812

(51) Int. Cl.
*G02F 1/1345* (2006.01)

(52) U.S. Cl.
USPC .......................................................... 349/149

(58) Field of Classification Search
USPC .................................... 349/149–150, 151, 43
See application file for complete search history.

(56) References Cited

U.S. PATENT DOCUMENTS 4,501,144 A * 2/1985 Higashi et al. ............. 73/204.26
4,838,656 A * 6/1989 Stoddard ....................... 349/150
5,499,131 A * 3/1996 Kim .............................. 349/149
5,757,450 A * 5/1998 Fujii et al. ..................... 349/106
6,104,465 A * 8/2000 Na et al. ........................ 349/152
7,267,555 B2 * 9/2007 Huang et al. .................... 439/74
7,466,387 B2 * 12/2008 Kim et al. ..................... 349/149
7,705,952 B2 * 4/2010 Lee et al. ...................... 349/151
7,965,285 B2 * 6/2011 Kwak et al. ................... 345/206

FOREIGN PATENT DOCUMENTS

KR 1020040013534 2/2004
KR 1020050000193 1/2005
KR 1020050066425 6/2005
KR 1020080063553 7/2008

* cited by examiner

*Primary Examiner* — James Dudek
(74) *Attorney, Agent, or Firm* — H.C. Park & Associates, PLC

(57) ABSTRACT

A display device may include an insulating substrate, a pixel electrode formed on the insulating substrate, a circuit board connected to the insulating substrate, a first wiring connected to the circuit board, and a second wiring for transmitting a signal to the pixel electrode. The second wiring may be connected to the first wiring, and the second wiring may have a larger resistance than the first wiring. Portions of the first wiring or the second wiring may include a zigzag pattern, and a swing width of a zigzag pattern of the second wiring may be varied depending on the position of the second wiring.

21 Claims, 3 Drawing Sheets

PCB
FPC
Display Area
GATE DRIVER
550
510
3
1
2
E
C
F
E
171
121
410
F

DISPLAY DEVICE HAVING FANOUT WIRING

CROSS REFERENCE TO RELATED APPLICATION

This application claims priority from and the benefit of Korean Patent Application No. 10-2009-0040812, filed on May 11, 2009, which is hereby incorporated by reference for all purposes as if fully set forth herein.

BACKGROUND OF THE INVENTION

1. Field of the Invention

Exemplary embodiments of the present invention relate to fanout wiring in a display device.

2. Description of the Background

A display device such as a liquid crystal display (LCD) or an organic electroluminescence (EL) display may include a plurality of pixels as basic elements for displaying an image. Each pixel may include a switching element for independent operation.

A Thin Film Transistor (TFT) array substrate may be used for independently driving each pixel in an LCD or an EL display device. A TFT array substrate may include a plurality of scanning signal lines or gate lines for transmitting scanning signals, a plurality of image signal lines or data lines for transmitting image signals, a plurality of TFTs connected to the gate lines and the data lines, a plurality of pixel electrodes connected to the TFTs, a gate insulating layer covering the gate lines for insulation, and a passivation layer covering the TFTs and the data lines for insulation.

The TFT may include a gate electrode, which is a part of the gate line, and a semiconductor layer for a channel. The TFT may further include a source electrode, which is a part of the data line, a drain electrode, a gate insulating layer, and a passivation layer. The TFT may be a switching element for transmitting or blocking the image signal from the data line to the pixel electrode in response to the scanning signal provided by the gate line.

Driving circuits may be located near edges of the display device and may be connected to end portions of the data lines and the gate lines. The driving circuits may be connected to the gate and data lines through a terminal of the wiring (gate or data lines), and the terminal portions of the wirings may be clustered in a small area for the connections with the driving circuits. Distances between the gate lines or between the data lines in a display area may have a value determined by the size of the pixels and may be larger than the distances between the respective terminal portions connected to the driving circuits. Accordingly, a plurality of fanout areas in which the distances between the signal lines (gate lines or data lines) gradually increase or decrease like a fan may be provided between the terminal portions and the display area.

Although the signal lines near the center of the fanout area extend in a straight line without curving, the signal lines closer to edges of the fanout area may have larger curving angles. This configuration of the fanout area results in a difference of length between the signal lines such that the line length near the center of the fan-out area may be shorter than the line length near the edges of the fanout area. The length difference may differentiate the respective resistance of the signal lines, which may result in deteriorated image quality.

SUMMARY OF THE INVENTION

Exemplary embodiments of the present invention provide fanout wiring in a display device.

Additional features of the invention will be set forth in the description which follows, and in part will be apparent from the description, or may be learned by practice of the invention.

According to exemplary embodiments of the present invention, a display device comprises a substrate, a pixel electrode, a circuit board, a first wiring, and a second wiring. The pixel electrode is formed on the substrate. The circuit board is connected to the substrate. The first wiring is connected to the circuit board. The second wiring transmits a signal to the pixel electrode. The second wiring is connected to the first wiring, and the second wiring has a larger resistance than the first wiring. A portion of the second wiring comprises a zigzag pattern. A swing width of the zigzag pattern varies depending on a position of the second wiring.

According to exemplary embodiments of the present invention, a display device comprises a substrate, a pixel electrode, a gate line, a data line, a circuit board, a first wiring, and a one second wiring. The pixel electrode is formed on the substrate. The gate line and the data line are formed on the substrate. The circuit board is connected to the substrate. The first wiring is connected to the circuit board, and the second wiring transmits a signal to the pixel electrode. The second wiring is connected to the first wiring. The second wiring has a larger resistance than the first wiring. A portion of the second wiring comprises a zigzag pattern. A swing width of the zigzag pattern varies depending on a position of the second wiring. The pixel electrode comprises a side parallel to the gate line and a side parallel to the data line. A length of the side parallel with the gate line is longer than a length of the side parallel to the data line.

It is to be understood that both the foregoing general description and the following detailed description are exemplary and explanatory and are intended to provide further explanation of the invention as claimed.

BRIEF DESCRIPTION OF THE DRAWINGS

The accompanying drawings, which are included to provide a further understanding of the invention and are incorporated in and constitute a part of this specification, illustrate exemplary embodiments of the invention, and together with the description serve to explain the principles of the invention.

DETAILED DESCRIPTION OF THE ILLUSTRATED EMBODIMENTS

Figure 1:
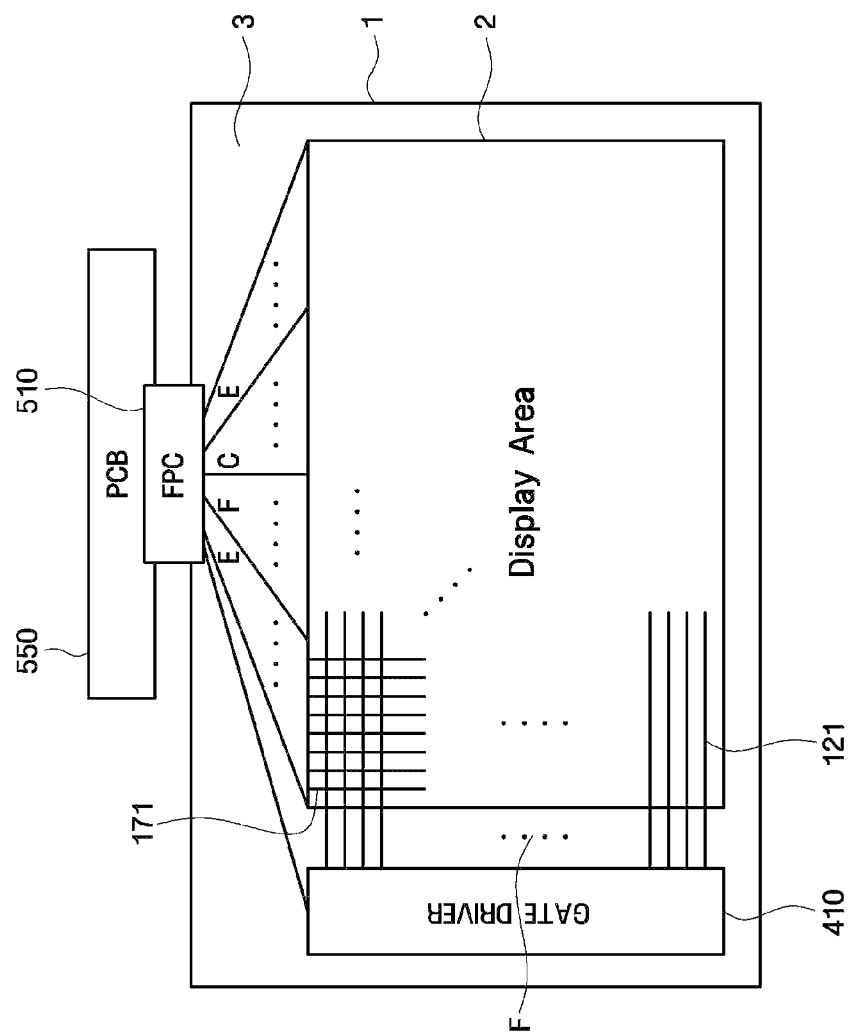
FIG. 1 is a schematic layout view of an array substrate according to exemplary embodiments of the present invention.

The invention is described more fully hereinafter with reference to the accompanying drawings, in which exemplary embodiments of the invention are shown. This invention may, however, be embodied in many different forms and should not be construed as limited to the exemplary embodiments set forth herein. Rather, these exemplary embodiments are provided so that this disclosure is thorough, and will fully convey the scope of the invention to those skilled in the art.

In the drawings, the thickness of layers and regions are exaggerated for clarity. Like numerals refer to like elements throughout. It will be understood that when an element such as a layer, region, panel or substrate is referred to as being "on" or "connected to" another element, it can be directly on or directly connected to the other element or intervening elements may also be present. In contrast, when an element is referred to as being "directly on" or "directly connected to" another element, there are no intervening elements present.

Hereinafter, exemplary embodiments of the present invention are described in detail with reference to the accompanying drawings.

FIG. 1 is a schematic layout view of an array substrate according to exemplary embodiments of the present invention. A display device may include an array substrate 1, an opposing substrate (not drawn) facing the array substrate, and a liquid crystal layer (not drawn) interposed between the array substrate and the opposing substrate.

Referring to FIG. 1, the array substrate 1 may include a display area 2 and a non-display area (peripheral area) 3. An image may be displayed in the display area and a pixel electrode may be located in the display area. A plurality of wirings for transmitting signals to the pixel electrode may be located in the non-display area (peripheral area) 3. A gate circuit driver 410 and a data circuit driver 510 for driving the pixel electrode in the display area may be connected to the pixel electrode. A printed circuit board 550 having a control circuit for controlling the gate driving circuit 410 and the data driving circuit 510 may be connected to the gate driving circuit 410 and the data driving circuit 510.

The opposing substrate (not drawn) may include a black matrix (not drawn) having a plurality of apertures arranged in a matrix, a plurality of primary color filters (not drawn) such as red, green, and blue color filters, and a common electrode (not drawn).

The display area 2 of the array substrate 1 may include a plurality of gate lines 121, a plurality of data lines 171, a pixel electrode, and a TFT. The plurality of gate lines 121 may transmit a scanning signal and may be formed in a first direction. The plurality of data lines 171 may transmit an image signal to a pixel electrode and may be formed in a second direction crossing the gate lines 121. The pixel electrode may be formed with a transparent material such as ITO (indium tin oxide) and/or IZO (indium zinc oxide) in the display area 2. The TFT (not drawn) may control the image signal transmitted to the pixel electrode based on the scanning signal. The TFT may be formed at a crossing portion of a gate line and a data line.

The array substrate 1 may include a display area 2 and a non-display area 3 surrounding the display area 2. The display area 3 may display an image and may include a plurality of the pixel electrodes. The non-display area 3 may include one or more fanouts (F) transmitting a scanning signal to the gate driving circuit 410 and/or an image signal to the data driving circuit 510. The gate driving circuit 410 may provide the scanning signal to the gate lines 121 in the display area 2, and the data driving circuit 510 may provide the image signal to the data lines 171 in the display area 2. The fanouts (F) may be connected to the gate lines 121 and the data lines 171.

The gate driving circuit 410 and the data driving circuit 510 may be connected to the gate lines 121 and the data lines 171, respectively, through the fanouts (F).

The fanouts (F) near the gate driving circuit 410 and near the data driving circuit 510 may be formed in a similar structure. In some cases, a distance between wiring may be shorter at the fanout portion connected to the data driving circuit 510 compared to the fanout portion connected to the data lines 171. This structure may be formed because the distance between the data lines 171 is longer than the distance between output terminals of the data driving circuit 510. The distance between the data lines 171 may be changed according to a size of the pixel electrode or a shape of the pixel electrode. A straight length of the fanout wiring may be shorter at a center (C) of the data driving circuit 510 relative to the length of the fanout wiring at both edges (E) of the data driving circuit 510.

Referring to the FIG. 1, the gate driving circuit 410 may be formed on the insulating substrate. The gate driving circuit 410 may be formed in the non-display area 3 and on one side of the display area 2. In some cases, the gate driving circuit 410 may be connected to the array substrate 1 through a Flexible Printed Circuit (FPC) on a film. The gate driving circuit 410 may be connected to the printed circuit board 550 having a control circuit.

Figure 2:
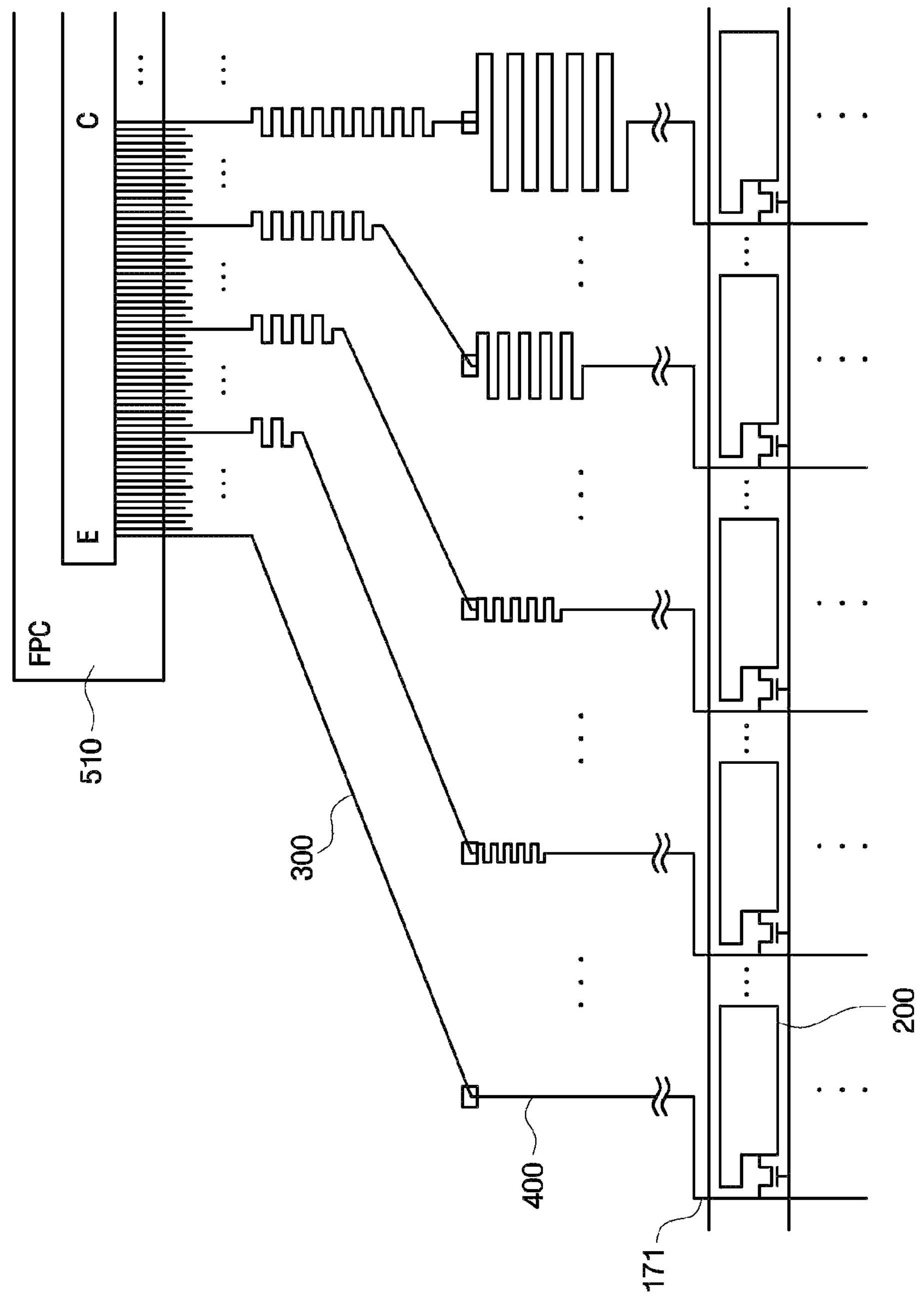
FIG. 2 is an enlarged layout view of the fan-out portion of FIG. 1 according to exemplary embodiments of the present invention.

FIG. 2 is an enlarged layout view of the fan-out portion of FIG. 1 according to exemplary embodiments of the present invention.

Referring to the FIG. 2, a fanout (F) may include a first wiring 300 and a second wiring 400. The first wiring 300 may be connected to the data driving circuit 510 and the second wiring 400. The second wiring 400 may be connected to the first wiring 300 and the data lines 171. The first and second wiring 300 and 400 may be formed using a material such as, for example, a metal. In some cases, the second wiring 400 may be formed using a material having a larger resistance than the material of the first wiring 300. The first wiring 300 may be formed using the same material as the gate lines 121 or data lines 171. The second wiring 400 may be formed using the same material as the pixel electrode. In some cases, a first and second wiring connected to the data driving circuit 510 may include a first zigzag pattern and a second zigzag pattern, respectively. In some cases, the first and second zigzag pattern may have the same pattern and size. In some cases, the first and second zigzag pattern may have the same pattern but may vary in size. In some cases, the first and second zigzag pattern may have a different pattern and a different size. The first and second wiring may be connected to the center (C) of the data driving circuit 510 and may have an extended length and greater resistance provided by a zigzag pattern. However, a first and second wiring connected to the edge (E) of the data driving circuit 510 may be straight lines without a zigzag pattern. A swing width of the zigzagged second wiring (e.g., second zigzag pattern) connected to the center (C) of the data driving circuit 510 may have the biggest swing width. The swing width of the zigzagged second wiring (e.g., second zigzag pattern) may become smaller in second wirings that are further away from the center and closer to the edge of the data driving circuit 510 or pixel electrode 200, as shown in FIG. 2. A swing width of the zigzagged second wiring (e.g., second zigzag pattern) between the center and the edge of the data driving wiring may have a value based on the position of the second wiring. In general, a swing width may be the width of a zigzag pattern.

Referring to FIG. 2, a swing width of the zigzagged second wiring connected to the center of the data driving circuit 510 may be approximately equivalent to a length of a side of the pixel electrode connected to the second wiring. The pixel electrode may include a side parallel to the gate lines 121 and another side parallel to the data lines 171. If a length of the side parallel to the gate lines 121 is longer than a length of the side parallel to the data lines 171, the center of the display area 2 may face the center of the data driving circuit 510.

The first and second wiring 300 and 400 may be connected to each other. The connection may be formed through a contact hole. The second wiring 400 and a data line may be connected through a contact hole.

The swing width of a zigzagged first wiring (e.g., first zigzag pattern) may be controlled and may, in some cases, be a constant swing width whether the first wiring is at the center or closer to the edge of the data driving circuit 510.

The data driving circuit 510 may be a structure formed on a film. A terminal of the first wiring 300 and the data driving circuit 510 may be connected by an anisotropic conductive film (ACF). In general, any suitable method may be used to connect the first wiring 300 and the data driving circuit 510.

Hereinafter, exemplary embodiments of the present invention will be explained with reference to TABLE 1. In comparative sample 1 (Com. 1), a straight fanout wiring is formed without having a zigzagged pattern at the center and at the edge of the data driving circuit 510. The first and second wiring is formed in a straight line using the same material. The total length of the edge portion of the fanout (F) is 148,000 μm and the resistivity is 4.4 kΩ. The total length of the center portion of the fanout (F) is 4,300 μm and the resistivity is 0.13 kΩ. A difference between the edge and the center resistivity is 4.27 kΩ, which may lead to signal delivery problems and degraded display quality.

TABLE 1

| | Edge (E) (lenth of wiring/ resistivity) | Center (C) (lenth of wiring/ resistivity) | Resistivity difference between ceter and edge |
|---|---|---|---|
| Com. 1 | 148,000 μm/4.4 kΩ | 4,300 μm/0.13 kΩ | 4.27 kΩ |
| Com. 2 | 148,000 μm/4.4 kΩ | 14,000 μm/0.4 kΩ | 4.0 kΩ |
| Emb. 1 | 148,000 μm/4.4 kΩ<br>200 μm/0.53 kΩ (IZO) | 14,000 μm/0.4 kΩ<br>1,700 μm/4.4 kΩ (IZO) | 0.13 kΩ |

In a comparative sample 2 (Com.2), the first and second wiring is formed in a straight line using the same material (e.g., a first wiring material). The fanout wiring at the edge is a straight line and the fanout wiring at the center has a zigzagged pattern to control (e.g., increase) a length of the fanout wiring at the center. The second wiring, made of the same material as the first wiring, has a same swing width as the first wiring. The swing width of respective first and second wirings between the center and the edge may be controlled (e.g., increased) gradually. A total length of the edge portion of the fanout (F) is 148,000 μm and the resistivity is 4.4 kΩ. A total length of the center portion of the fanout (F) is 14,000 μm and the resistivity is 0.4 kΩ. A difference between the edge and the center resistivity in Com.2 is 4.0 kΩ and may lead to signal delivery problems and degraded display quality.

In an embodiment sample (Emb.1), the fanout (F) has first and second wiring. The second wiring is formed with a larger resistivity material than the first wiring. At the edge of the fanout (F), the first and second wiring are straight, and at the center of the fanout (F), the first and second wiring have a zigzagged pattern to control (e.g., increase) a length of the fanout wiring. The swing width of the zigzagged second wiring in the center corresponds to a side length of the pixel electrode. IZO (Indium Zinc Oxide) may be used as the material for the second wiring and the pixel electrode. In general, the first wiring and the second wiring may be implemented using any suitable material. A length of the first wiring at the edge portion is 148,000 μm and the resistivity is 4.4 kΩ. A length of the second wiring at the edge portion is 200 μm and the resistivity is 0.53 kΩ. So, the total resistivity at the edge portion of the fanout (F) is 4.93 kΩ. A length of the first wiring at the center portion is 14,000 μm and the resistivity is 0.4 kΩ. A length of the second wiring at the center portion is 17,000 μm and the resistivity is 4.4 kΩ. So, the total resistivity of the center portion of the fanout is 4.8 kΩ. The total resistivity may be calculated by adding the resistivity of the first wiring and the second wiring since the first and second wirings 300 and 400 are connected in series. In Emb.1, the resistivity difference between the edge and the center is 0.13 kΩ. Such resistance provides no problem in signal delivery and display quality.

Figure 3:
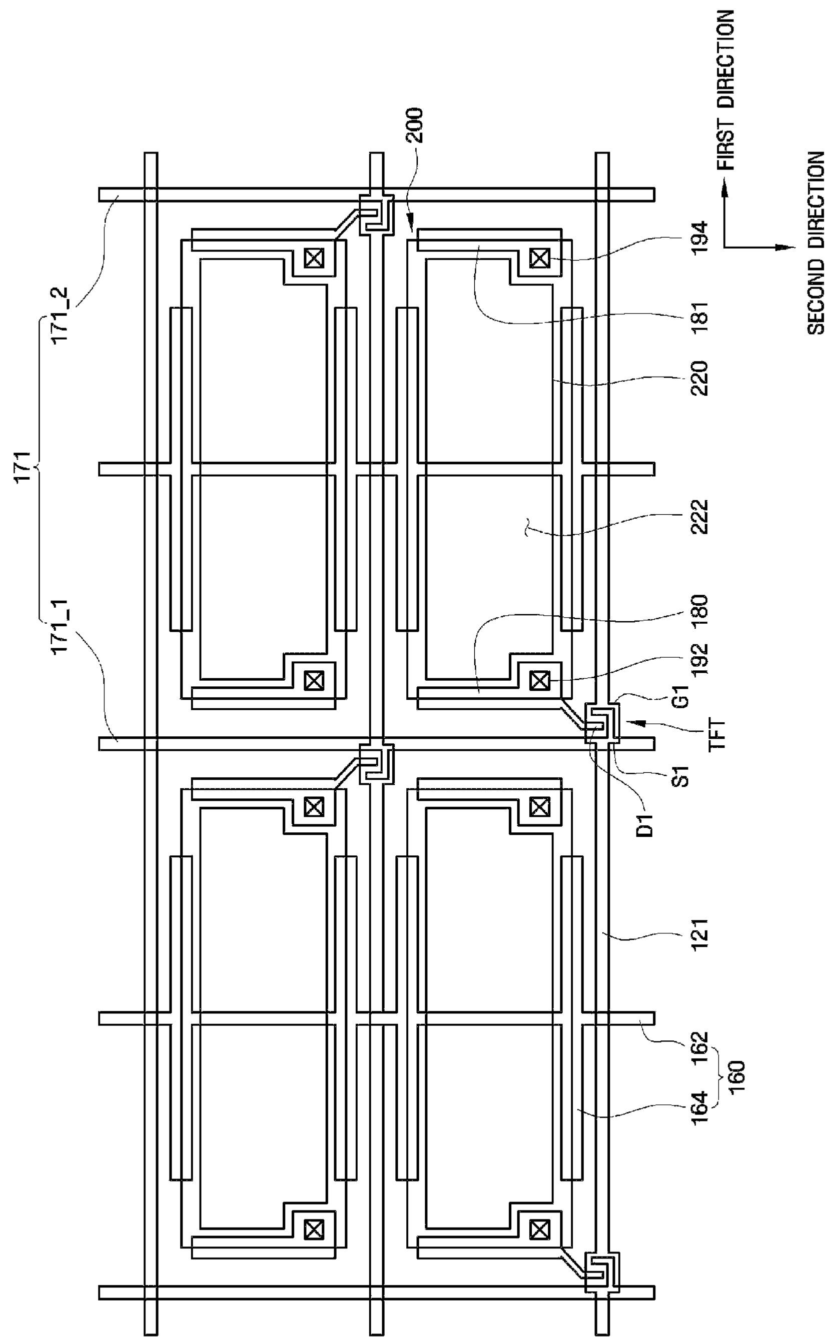
FIG. 3 is an enlarged view of the display area on the array substrate shown in FIG. 1 according to exemplary embodiments of the present invention.

FIG. 3 is an enlarged view of the display area on the array substrate shown in FIG. 1 according to exemplary embodiments of the present invention.

Referring to FIG. 3, the display area 2 of the array substrate 1 may include a first insulating substrate (not drawn), a gate line 121, a gate insulating layer (not drawn), a data line 171, a TFT (thin film transistor), a first voltage-maintaining electrode 180, a second voltage-maintaining electrode 181, a passivation layer, and a pixel electrode 200.

The first insulating substrate may have a plate shape and may contain a transparent material. In some cases, a transparent plastic, glass, or quartz may be used as the first insulating substrate. In general, the first insulating substrate may be implemented using any suitable material. The gate line 121 may be formed on the first substrate. The gate insulating layer may be formed on the first substrate to cover the gate line 121. The data line 171, the storage wiring 160, the first voltage-maintaining electrode 180, and the second voltage-maintaining electrode 181 may be formed on the gate insulating layer.

The thin-film transistor TFT may include a gate electrode G1, a source electrode S1, a drain electrode D1, an activation layer (not drawn), and an ohmic contact layer (not drawn). The gate electrode G1 may extend from the gate line 121. The activation layer may be formed on the gate insulating layer covering the gate electrode G1. The source electrode S1 may extend from the data line 171 and may be formed over the activation layer. The drain electrode D1 may be spaced apart from the source electrode S1 and may be formed on a portion of the activation layer. The ohmic contact layer may be formed between the activation layer and the source electrode S1. An ohmic contact layer may also be formed between the activation layer and the drain electrode D1.

The passivation layer (not drawn) may be formed on the gate insulating layer to cover the data line 171, the storage wiring 160, the first voltage-maintaining electrode 180, the second voltage-maintaining electrode 181, and the thin-film transistor TFT. A first contact hole 192 and a second contact hole 194 may be formed in a portion of the passivation layer that is covering the first and second voltage-maintaining electrodes 180 and 181. The pixel electrode 200 may be formed on the passivation layer. The pixel electrode 200 may be electrically connected to the first voltage-maintaining electrode 180 and drain electrode D1 through the first contact hole 192. The pixel electrode 200 may be electrically connected to the second voltage-maintaining electrode 181 through the second contact hole 194.

The pixel electrode 200 may include a side parallel to the gate line and a side parallel to the data line. In some cases, a length of the side parallel to the gate line may be longer than a length of the side parallel to the data line.

Hereinafter, a planar disposing relation of the array substrate 1 according to exemplary embodiments will be described. A gate line 121 may be formed along the first direction, and a data line 171 may be formed along the second direction. The second direction may be substantially perpendicular to the first direction. A pixel electrode 200 may be formed on the pixel area that is near the gate line 121 and the data line 171.

The gate line 121 may be formed on one of the lower or upper portions of the pixel electrode 200. The data line 171 may be formed on a left and/or right portion of the pixel electrode 200. Hereinafter, a data line 171 formed on the left portion of the pixel electrode 200 may be referred to as a first data line 171-1, and a data line 171 formed on the right portion of the pixel electrode 200 may be referred to as a second data line 171-2.

The first and second voltage-maintaining electrodes 180 and 181 may be formed within a pixel area. The first voltage-maintaining electrode 180 may be spaced apart from a right portion of the first data line 171-1. The first voltage-maintaining electrode 180 may be electrically connected to the pixel electrode 200 through first contact hole 192. The second voltage-maintaining electrode 181 may be spaced apart from a left portion of the second data line 171-2. The second voltage-maintaining electrode 181 may be electrically connected to the pixel electrode 200 through second contact hole 194.

The storage wiring 160 may be formed along the second direction. In particular, the storage wiring 160 may include a main wiring 162 and a sub wiring 164.

The thin-film transistor TFT may be electrically connected to one of the first voltage-maintaining electrode 180 and the second voltage-maintaining electrode 181 that are formed in each of the pixel areas.

In some cases, the second substrate (not drawn) opposing the array substrate 1 may include a second insulating substrate, a light blocking layer 220, a color filter (not drawn), and a common electrode (not drawn).

The second base substrate may have a plate shape and may contain a transparent material.

The light blocking layer 220 may be formed on one side of the second insulating substrate. For example, the light blocking layer 220 may cover the gate line 121, the data line 171, the thin-film transistor TFT, the first voltage-maintaining electrode 180, and the second voltage-maintaining electrode 181. Light may be transmitted to an opening area 222 of the light blocking layer 220, so that images may be displayed.

The color filter may be formed on the second insulating substrate. The common electrode may be formed on the surface of the color filter. The common electrode may include a transparent and/or conductive material. A planarization layer (not shown) may be formed between the color filter and the common electrode. It should be understood that any type of color filter (e.g., red, blue, green) and any suitable number of filters may be used and/or formed on the second insulating substrate.

Method of Manufacturing an Array Substrate

Hereinafter, a method of manufacturing the array substrate 1 of the display device according to exemplary embodiments of the present invention will be explained.

A gate line may be formed on a first insulating substrate along a first direction. The gate line may be formed by patterning a metal layer that is deposited using a sputtering method.

Then, a gate insulating layer may be disposed on the insulating substrate on which the gate line is formed, so that the gate insulating layer covers the gate line. An activation layer and an ohmic contact layer may be deposited on the gate insulating layer, and the activation layer and the ohmic contact layer may be partially removed.

Then, a data line, a first voltage-maintaining electrode 180, and a second voltage-maintaining electrode 181 may be formed simultaneously on the gate insulating layer. The data line 171 may extend along the second direction. The first and second voltage-maintaining electrodes 180 and 181 may be formed using the same material used to form the data line 171.

When the data line 171 is formed on the gate insulating layer, a source electrode S1 and a drain electrode D1 may also be formed simultaneously on the gate insulating layer.

The first wiring 300 of the fanout (F) in the non-display area may be formed simultaneously when the gate line 121 or the data line 171 is formed. The first wiring 300 may be formed using the same material used to form the gate line 121 or the data line 171. The first wiring 300 may be formed in the same layer as the gate line 121 or data line 171.

A passivation layer may be formed on the gate insulating layer on which the data line 171, the storage wiring 160, the first voltage-maintaining electrode 180, and the second voltage-maintaining electrode 181 are formed, so that the passivation layer may cover the data line 171, the storage wiring 160, the first voltage-maintaining electrode 180, and the second voltage-maintaining electrode 181.

A portion of the passivation layer may be removed by an etching process, so that contact holes 192, 194 may be formed. The contact holes 192, 194 may be formed on an area corresponding to the first and second voltage-maintaining electrodes 180 and 181, respectively.

A pixel electrode 200 may be formed on the passivation layer, which is electrically connected to the first and second voltage-maintaining electrodes 180 and 181 through the contact holes 192, 194. The pixel electrode 200 may be formed with a transparent and conductive material such as, for example, IZO (Indium Zinc Oxide), ITO (Indium Tin Oxide), and material having a carbon nanotube or organic materials. In general, any suitable material may be used to form the pixel electrode. The second wiring 400 of the fanout (F) in the non-display area may be formed at the same time as the pixel electrode 200. The second wiring 400 may be formed using the same material used to form the pixel electrode 200. The second wiring 400 may be formed in the same layer as the pixel electrode 200. A pixel electrode material may be used to connect the first wiring 300 and the second wiring 400, and the second wiring 400 and the data line 171.

It will be apparent to those skilled in the art that various modifications and variations can be made in the present invention without departing from the spirit or scope of the invention. Thus, it is intended that the present invention cover the modifications and variations of this invention provided they come within the scope of the appended claims and their equivalents.

What is claimed is:

1. A display device, comprising:

a substrate;

a plurality of pixels disposed on the substrate, wherein each pixel comprises a pixel electrode;

a circuit board connected to the substrate;

a plurality of first wirings connected to the circuit board; and a plurality of second wirings;

wherein the pixels are connected to receive a signal from a corresponding second wiring of the plurality of second wirings, and the corresponding second wiring is connected to a corresponding first wiring of the plurality of first wirings; and wherein portions of the second wirings comprise a zigzag pattern, and a swing width of each zigzag pattern is within projected lines extending from each corresponding pixel electrode's sides parallel to data lines toward the circuit board.

2. The display device of claim 1, wherein the zigzag pattern of each of the second wirings is disposed inside a corresponding convex surface area, and the convex surface areas corresponding to each of the second wirings do not overlap each other, wherein portions of the first wirings comprise a zigzag pattern, and lengths of the zigzag patterns corresponding to the first wirings are not all equal with each other, and wherein a swing width of the zigzag pattern of the first wiring disposed at the center of the fanout is the same as a swing width of the zigzag pattern of the first wiring disposed adjacent to the edge of the fanout.

3. The display device of claim 2, wherein the second wirings comprise the same material as the pixel electrode.

4. The display device of claim 3, further comprising:

switching elements connected to the pixel electrodes; and gate lines to transmit gate signals to the switching elements, wherein the gate signals are transmitted by gate driving circuits connected to the gate lines and formed on the substrate.

5. The display device of claim 3, further comprising:

switching elements connected to the pixel electrodes; and gate lines to transmit gate signals to the switching elements, wherein the gate signals are transmitted by gate driving circuits connected to the gate lines and the substrate.

6. The display device of claim 1, wherein the second wirings comprise the same material as the pixel electrode.

7. The display device of claim 6, further comprising:

switching elements connected to the pixel electrodes; and gate lines to transmit gate signals to the switching elements, wherein the gate signals are transmitted by gate driving circuits connected to the gate lines and formed on the substrate.

8. The display device of claim 6, further comprising:

switching elements connected to the pixel electrodes; and gate lines to transmit gate signals to the switching elements, wherein the gate signals are transmitted by gate driving circuits connected to the gate lines and the substrate.

9. The display device of claim 2 wherein a swing width of the zigzag pattern of the second wirings wiring disposed at the center of the fanout is equivalent to a length of a side of the pixel electrode connected to the second wiring disposed at the center of the fanout.

10. The display device of claim 2, further comprising data lines connected between the second wirings and the corresponding pixel electrodes, wherein a length of the zigzag pattern of the second wiring disposed at the center of the fanout is greater than a length of the zigzag pattern of the second wiring disposed at the edge of the fanout, the length of each zigzag pattern being measured along a direction the data line extends.

11. A display device, comprising:

a substrate;

a plurality of pixels disposed on the substrate, wherein each pixel comprises a pixel electrode;

a plurality of gate lines and data lines disposed on the substrate;

a circuit board connected to the substrate;

a plurality of first wirings connected to the circuit board; and a plurality of second wirings;

wherein the pixels are connected to receive a signal from a corresponding second wiring of the plurality of second wirings, and the corresponding second wiring is connected to a corresponding first wiring of the plurality of first wirings;

wherein portions of the second wirings comprise a zigzag pattern, and a swing width of each zigzag pattern is within projected lines extending from each corresponding pixel electrode's sides parallel to data lines toward the circuit board.

12. The display device of claim 11, wherein portions of the first wirings comprise a zigzag pattern, and lengths of the zigzag patterns corresponding to the first wirings are not all equal with each other, wherein the zigzag pattern of each of the second wirings is disposed inside a corresponding convex surface area, and the convex surface areas corresponding to each of the second wirings do not overlap each other, wherein a swing width of the zigzag pattern of the first wiring disposed at the center of the fanout is the same as a swing width of the zigzag pattern of the first wiring disposed adjacent to the edge of the fanout, and wherein the pixel electrodes comprise a side parallel to the gate line and a side parallel to the data line, a length of the side parallel to the gate line being longer than a length of the side parallel to the data line.

13. The display device of claim 12, wherein the swing width of the zigzag pattern of the second wiring disposed at the center of the fanout is substantially equal to the length of the side of the pixel that is parallel to the gate line.

14. The display device of claim 13, further comprising:

switching elements connected to the pixel electrodes; and gate lines to transmit gate signals to the switching elements, wherein the gate signals are transmitted by gate driving circuits connected to the gate lines and formed on the substrate.

15. The display device of claim 14, wherein the second wirings comprise the same material as the pixel electrodes.

16. The display device of claim 11, further comprising:

switching elements connected to the pixel electrodes; and gate lines to transmit gate signals to the switching elements, wherein the gate signals are transmitted by gate driving circuits connected to the gate lines and formed on the substrate.

17. The display device of claim 16, wherein the second wirings comprise the same material as the pixel electrodes.

18. The display device of claim 11, wherein the second wirings comprise the same material as the pixel electrodes.

19. The display device of claim 12, wherein a length of the zigzag pattern of the second wiring disposed at the center of the fanout is greater than a length of the zigzag pattern of the second wiring disposed at the edge of the fanout, the length of each zigzag pattern being measured along a direction the data line extends.

20. The display device of claim 1, wherein a swing width of the zigzag pattern decreases with a distance of the second wiring from the center of the fanout, and wherein the first wirings comprise a line portion that does not include the zigzag pattern, and a length of the line portion increases with a distance of the first wiring from the center of the fanout.

21. The display device of claim 11, wherein a swing width of the zigzag pattern decreases with a distance of the second wiring from the center of the fanout comprising the first wiring and the second wiring, and wherein the first wirings comprise a line portion that does not include the zigzag pattern, and a length of the line portion increases with a distance of the first wiring from the center of the fanout.

* * * * *